Sept. 20, 1932.   L. UNGER   1,878,030
AUTOMATIC CAMBER PLATE
Filed Oct. 27, 1930
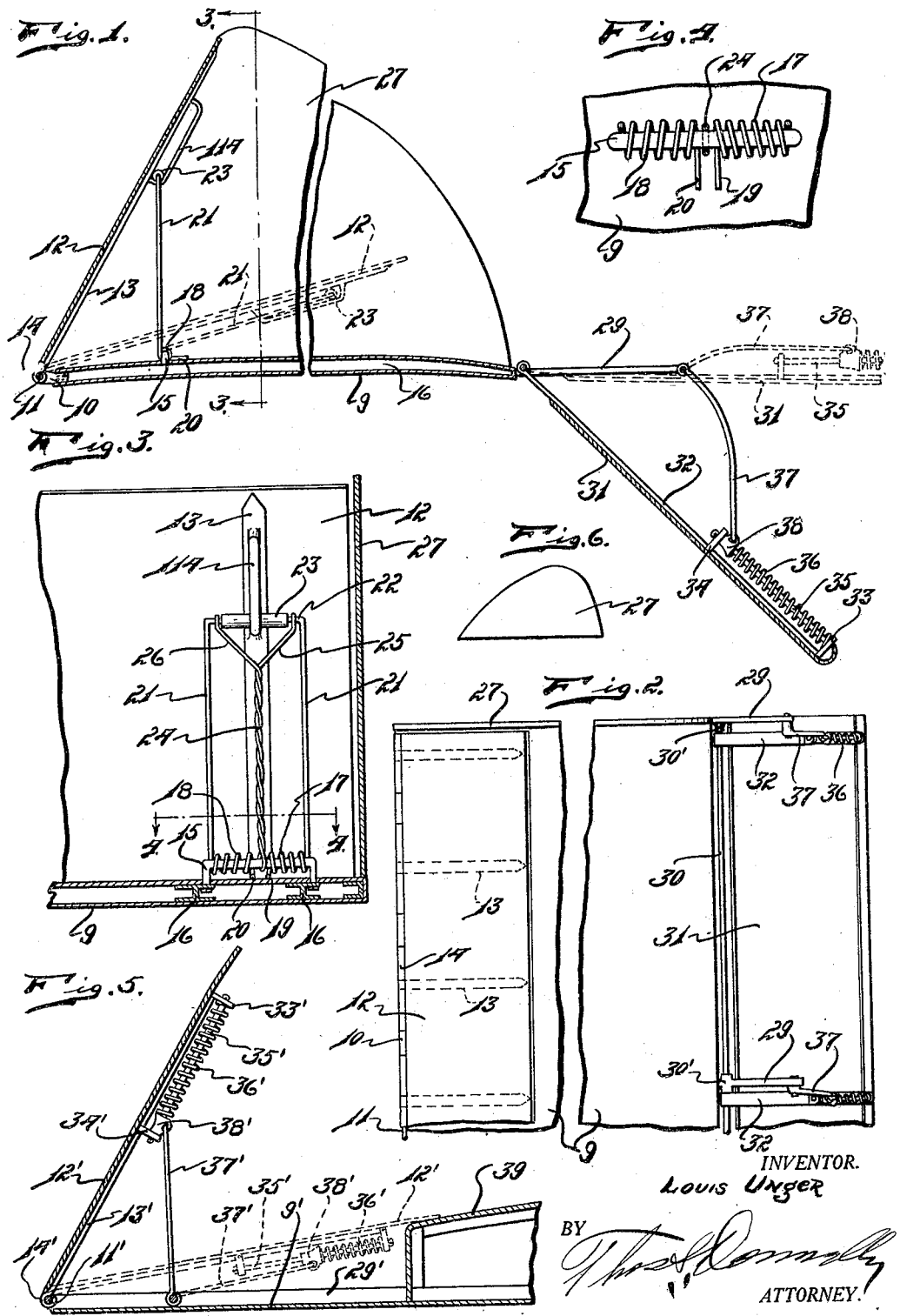
INVENTOR.
Louis Unger
BY
ATTORNEY.

Patented Sept. 20, 1932

1,878,030

UNITED STATES PATENT OFFICE

LOUIS UNGER, OF WARREN, MICHIGAN

AUTOMATIC CAMBER PLATE

Application filed October 27, 1930. Serial No. 491,393.

My invention relates to automatic camber plates for cambered aerofoils and has for its object the provision of automatically adjustable camber plates which will automatically move to lessen or increase the resistance offered as the speed of the airplane varies.

It is another object of the present invention to provide a movable camber plate so arranged and constructed that the proper and desirable partial vacuum above the planes may be produced and maintained at all times.

Another object of the invention is the provision of a camber plate movable into various positions so that the partial vacuum may be varied. Another object of the invention is the provision of a camber plate movable into the inoperative position so that undesirable air resistance when traveling at high speeds may be avoided, and it is also another object of the invention to prevent the disturbing side air flow into the vacuum during the flight.

It is another object of the present invention to provide in an airplane a forward and two rearward camber plates so arranged and constructed that maximum efficiency of the airplane may be obtained in taking off, in straight flight and in landing.

Another object of the invention is the provision of a camber plate so arranged and constructed as to be durable in structure, economically manufactured, efficient in use, and one the use of which on an airplane will result in economizing of fuel.

Other objects will appear hereinafter.

The invention consists in the combination and arrangement of parts hereinafter described and claimed.

The invention will be best understood by a reference to the accompanying drawing which forms a part of this specification and in which, Fig. 1 is a transverse sectional view through an airplane wing showing the invention applied.

Fig. 2 is a fragmentary top plan view of an airplane wing with a part broken away and showing the invention applied.

Fig. 3 is a fragmentary sectional view taken on line 3—3 of Fig. 1.

Fig. 4 is a fragmentary sectional view taken on line 4—4 of Fig. 3.

Fig. 5 is a fragmentary sectional view taken transversely through an airplane wing showing a modified form of the invention.

Fig. 6 is a side elevation of a side plate.

The invention is adapted for use with an airplane having a wing 9. Projecting outwardly from the edge of the wing 9 and secured thereto are bearing brackets 10 in which is supported a rod 11 which extends longitudinally of the wing at the forward edge thereof. A forward camber plate 12 is provided with a plurality of spaced transversely extending hinge straps 13, each of which is provided with an eyelet 14 embracing the rod 11 so as to swingably mount the camber plate in position on the wing 9.

On each of the hinge straps 13, intermediate the ends thereof, and adjacent the free ends thereof, are the U shaped guides 114. Extending transversely of the wing 9 are the reinforcing ribs 16 secured to which is the upwardly projecting U shaped support 15. Coils 17 and 18 which are formed from the same piece of wire are wound upon the support 15 and the ends 19 and 20 thereof engage the upper back surface of the wing 9, this wire extending upwardly in the form of a U shaped frame 21, the bight 22 of which extends through the guide 114 and is provided with a roller 23. A wire brace 24, having the branching arms 25 and 26, serves to uphold the springs by connecting the bight 22 to the center of the support 15.

The shape of the front camber plates may vary to fit the different types of the planes. Their width is about one-fifth of the chord. Thus an airplane having a wing spread of 30 feet and a chord of 5 feet shall be provided with a camber plate one foot wide. The plates are flat or slightly curved.

The camber plate 12 is shown in full lines in Fig. 1 in the position it assumes when the airplane is stationary. The stationary angle of incidence of the front camber plates is 60 degrees. I realize that this high angle of incidence is not recognized by many who claim that the angle of incidence cannot exceed 15 to 20 degrees. But as a matter of fact the present high cambered planes actually use an angle of inclination of 60 or even more degrees, otherwise the air flow forming the partial vacuum would not be thrown up so high immediately behind the leading edge of the planes. This angle of incidence, of course, diminishes when the camber plates move downward as shown in the dotted line position in Fig. 1.

The front camber plates reach their low critical angle when the airplane approaches its normal speed of travel. The speed at which the camber plate approaches its low critical angle will vary with different airplanes depending upon the uses to which the airplane is put and the speed at which it is normally intended to travel.

With the ordinary commercial airplane used for traveling at high speeds, the resistance is so adjusted that the air pressure met when travelling at a speed of about 80 miles p. h. will serve to rock the front camber plate to its low critical angle of incidence. This adjustment of the tension of the springs may be determined empirically either in actual flying tests or in a wind tunnel.

When making wind tunnel tests no special model is necessary. One can use a part of the actual front plate. A plate which is 2 feet long and 1 foot wide provided with a spring and hinged on a smaller horizontal plate, will show the different angles of incidence at various wind speeds. If a speed of 80 miles per hour is desired for the low critical angle of the front plate, the experiments shall determine the necessary strength of the springs. Having found the proper springs it is evident that a front plate which is 15 times longer than the "model" plate, will use 15 similar springs for the same speed. Similar tests are made with the rear camber plate, using a wind speed of only 20 to 30 miles per hour if such a speed is desired for the low critical angle of the rear plates.

Low cambered airplanes are using the front plates either so that the plates are hinged direct to their leading edge, or so, that the plates with their springs are built on the outstanding ribs in the front of the planes. The front extension of the ribs is ten and three-quarters of an inch long, provided, that the chord is 5 feet and the front plate is 1 foot wide. When approaching a landing, the camber plates returning to their high angle position, the speed will be retarded and because of the increase in lifting power of the planes a sharp descent can be made at comparatively low speed. The extension of the ribs is closed.

Airplanes built with the usual high camber are using the front camber plates on the front extension of the ribs. In Fig. 5, I have illustrated the invention applied to an airplane having the camber 39. The rib extensions 29′ of the wing 9′ extend forwardly of the camber 39, and secured to the outer ends of the rib extensions 29′ is a rod 11′ embracing which are the eyelets 14′ on the hinge straps 13′ on which the camber plate 12′ is mounted. The spaced lugs 33′ and 34′ extend outwardly from the hinge strap 13′ and serve as a mounting for the rod 35′ on which the coil spring 36′ is positioned. The nut 38′ slidably mounted on the rod 35′ is pivotally connected to one end of the rod 37′ the other end of which is connected to the rib extension 29′. It will be noted that the lug 33′ is positioned inwardly of each of the camber plates 12′ and that when this plate is moved to its low critical angle of incidence, the edge of the plate 12′ rests upon the stationary camber 39, which may be built ten and three-quarters of an inch shorter in order to keep its chord of 5 feet.

It is believed obvious that the invention may be utilized on a camber plate which is made of sufficient size to extend the full length of the plane or that a plurality of sections in alignment with each other, each provided with its own yieldable resistance means, may be employed instead of a single plate.

A side plate 27 is mounted at the end of the wing to prevent the lateral air flow into the partial vacuum. This side flow is a great deal responsible for what is known as burbling. The side plates run parallel to the fuselage, giving more lateral stability to the planes. The shape of their upper edge follows the path of the air flow above the partial vacuum as shown in Fig. 6. The height of the side plates is half of the length of the chord.

The transverse reinforcing ribs of the wing 9 have a portion 29 which projects rearwardly of the rear edge of the wings on such structures as would require or be provided with a trailing camber plate. Secured in suitable bearings 30′ which are mounted on the extensions 29 and extending longitudinally of the wing 9 is a rod 30. Between the rod 30 and rear camber plate 31 there is an interspace one inch wide.

A rear camber plate 31 is provided with spaced hinge straps 32 whereby this rear plate is hingedly mounted on the rear edge of the wing 9 and is adapted to depend in inclined position rearwardly of the wing 9. Secured to and projecting upwardly from the hinge straps 32, adjacent the free ends thereof, are the spaced lugs or supports 33 and 34, secured to and extending between which is a rod 35 on which is loosely positioned in embracing relation the coil spring 36, one end of which engages the lug 33 and the other end of which engages the nut 38 which is slidably mounted on the rod 35. Pivotally connected at one end to the nut 38 is an arcuate rod or arm 37, the opposite end of which is pivotally connected to the outer end of the rib extension 29.

The stationary angle of inclination of the rear camber plates is 45 degrees and is formed between the rib extensions 29 and the plane of the plate 31. A large angle of this nature shortens the run at the take off and at the landing also. With a light machine having the front and rear camber plates, the take off and the landing will be very similar to that of the birds.

The front plates cut the air with a sharp edge, thus any height is quickly attained. When the airplane travels forwardly, or upwardly, the rear plate 31 will also be swung to the position shown in dotted line in Fig. 1 on account of the air pressure. The sharp leading edge and the mentioned interspace between the wings and the rear plates, secures the continuity of the air flow when moving upward. The width of the rear plates is one-fifth of the chord. Thus an airplane having a wing spread of 30 feet and a chord of 5 feet when provided with the 1 foot wide rear camber plates, will change the aspect ratio from 6 to 5.

In some instances it perhaps would be undesirable to use both the front and the rear camber plates, but it is evident that if only one of the plates were to be used, its function would be the same excepting that the cooperative effect of the front and the rear plates would not be present.

I have illustrated a spring or resilient arrangement which serves to resist the rearward or upward rocking movement of the automatic camber plates, but it is obvious that any yieldable structure will function with the same result.

The ailerons are located as usually at the trailing edge of the wings, that is, between the planes and the rear plates. At bankings the correspondent rear plates work in concordance with the ailerons, because a downwardly opened aileron turns the air flow downward, thus lessening the air stream beneath the rear plate which tends to incline downward, increasing its lifting power; the opposite wing, sinking downward, keeps its rear plate at its highest possible position under the rib extensions.

Another possible location of the ailerons may be arranged by dividing a rear plate into two parts, the outer part of which shall be the aileron, handled by the pilot, and the inner part will be the automatic rear camber plate which in this case may be made wider if desired. If the rear plates are used but inside, the outer parts being ailerons, the mid-rib of the wing must be extended too, to hold the plate. Such an extension of more ribs will be necessary in all airplanes which have a big wing spread.

An airplane which has low wings can use the rear camber plates so that its fuselage is provided with outstanding sticks, connected with the springs of the rear plates in the described way. No inside rib extension is necessary in this case.

The advantages of the automatic camber plates are primarily the shortening of the take off, making it possible to land at low speed with practically any kind of a plane, increasing the speed of all airplanes equipped with the camber plates and especially increasing the speed of high cambered planes, a continuance of the air flow when moving to attain elevation, and a fuel saving while in operation.

While I have illustrated and described the preferred forms of construction of my invention, I do not wish to limit myself to the precise details of structure shown, but desire to avail myself of such variations and modifications as may come within the scope of the appended claims.

Having thus described my invention what I claim as new and desire to secure by Letters Patent is:

1. In combination, an aeroplane wing; a camber plate swingably mounted on said wing adjacent the forward edge thereof and normally inclined rearwardly to the vertical and adapted, upon forward movement of the aeroplane, for swinging toward the horizontal in response to the air pressure; yieldable means for resisting swinging movement of said plate toward the horizontal; a camber plate swingably mounted on said wing adjacent the rear edge thereof and normally inclined rearwardly to the vertical and adapted, upon forward movement of the aeroplane, for swinging toward the horizontal; and yieldable means for resisting swinging movement of the same toward the horizontal.

2. In combination, an aeroplane wing; a camber plate swingably mounted on said wing adjacent the forward edge thereof and projected upwardly thereof, rearwardly therefrom and normally at an incline to the horizontal and adapted, upon forward movement of the aeroplane, for moving toward the horizontal; yieldable means for resisting said movement; a camber plate swingably mounted on said wing adjacent the rear edge thereof and projected downwardly therefrom rearwardly thereof and normally inclined to the horizontal and adapted upon forward movement of the aeroplane for moving toward the horizontal; and yieldable means for resisting said movement.

3. In combination, an aeroplane wing; a camber plate swingably mounted on said wing adjacent the forward edge thereof and projected upwardly therefrom and normally inclined rearwardly thereof and adapted, upon forward movement of the aeroplane for moving toward the horizontal into approach relatively to said wing; spring means for resisting said movement; a camber plate swingably mounted on the rear edge of said wing and extending rearwardly therefrom and downwardly thereof and inclined to the horizontal and adapted, upon forward movement of the aeroplane for moving, in response to the air pressure, toward the horizontal; and resilient means for resisting said movement.

4. In combination, an aeroplane wing; a camber plate swingably mounted on said wing, adjacent the forward edge thereof, and projecting upwardly and rearwardly therefrom at an inclination to the horizontal; yieldable means exterior of said wing for resisting movement of said plate toward the horizontal; a camber plate swingably mounted on the rear edge of said wing and projected rearwardly and downwardly therefrom at an inclination to the horizontal; and means exterior of said wing for resisting movement of said plate toward the horizontal.

In testimony whereof I have signed the foregoing specification.

LOUIS UNGER.